(12) United States Patent
Haleem et al.

(10) Patent No.: US 11,038,964 B2
(45) Date of Patent: Jun. 15, 2021

(54) SYSTEMS AND METHODS FOR SMART DEVICE NETWORKING

(71) Applicant: Helium Systems, Inc., San Francisco, CA (US)

(72) Inventors: Amir Haleem, San Francisco, CA (US); Andrew Thompson, Norwood, NY (US); Eric Gnoske, Colorado Springs, CO (US); Blake Leverett, Colorado Springs, CO (US); Mike Vidales, Colorado Springs, CO (US); Sean Carey, Boston, MA (US); Theo Wilson, Berkeley, CA (US)

(73) Assignee: HELIUM SYSTEMS, INC., San Francisco, CA (US)

( * ) Notice: Subject to any disclaimer, the term of this patent is extended or adjusted under 35 U.S.C. 154(b) by 217 days.

(21) Appl. No.: 16/511,858

(22) Filed: Jul. 15, 2019

(65) Prior Publication Data
US 2019/0349434 A1 Nov. 14, 2019

Related U.S. Application Data

(63) Continuation of application No. 15/483,930, filed on Apr. 10, 2017, now Pat. No. 10,412,171, which is a (Continued)

(51) Int. Cl.
| | |
|---|---|
| *H04L 29/08* | (2006.01) |
| *H04W 4/70* | (2018.01) |
| *H04L 12/743* | (2013.01) |
| *H04W 4/80* | (2018.01) |
| *H04L 12/46* | (2006.01) |

(Continued)

(52) U.S. Cl.
CPC ......... *H04L 67/12* (2013.01); *H04L 12/4625* (2013.01); *H04L 45/7453* (2013.01); *H04W 4/70* (2018.02); *H04W 4/80* (2018.02); *H04L 61/6022* (2013.01); *H04L 63/0428* (2013.01); *H04L 67/1002* (2013.01); *H04L 2212/00* (2013.01); *H04W 4/02* (2013.01); *H04W 40/20* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | |
|---|---|---|
| 7,200,684 B1 | 4/2007 | Schales et al. |
| 7,653,813 B2 | 1/2010 | Venkitaraman et al. |

(Continued)

OTHER PUBLICATIONS

U.S. Appl. No. 14/919,664 Notice of Allowance dated Jan. 17, 2017.

(Continued)

*Primary Examiner* — Diane L Lo
(74) *Attorney, Agent, or Firm* — Wilson Sonsini Goodrich & Rosati

(57) ABSTRACT

A system for smart device networking includes an endpoint that enables communication with a connected device, a bridge that communicates with the endpoint over a PAN and relays PAN communications to a WAN, and a router that connects to the bridge through the WAN and routes communication to and from the endpoint.

20 Claims, 11 Drawing Sheets

Related U.S. Application Data continuation of application No. 14/919,664, filed on Oct. 21, 2015, now Pat. No. 9,661,080.

(60) Provisional application No. 62/066,678, filed on Oct. 21, 2014.

(51) Int. Cl.
*H04W 40/20* (2009.01)
*H04L 29/06* (2006.01)
*H04W 84/12* (2009.01)
*H04W 88/06* (2009.01)
*H04L 29/12* (2006.01)
*H04W 4/02* (2018.01)

(56) References Cited

U.S. PATENT DOCUMENTS

| | | | |
|---|---|---|---|
| 8,000,239 | B2 | 8/2011 | Marcondes et al. |
| 8,139,589 | B2 | 3/2012 | Choi et al. |
| 8,213,463 | B2 | 7/2012 | Noonan et al. |
| 9,253,811 | B2 | 2/2016 | Kotecha et al. |
| 9,270,636 | B2 | 2/2016 | Narasimhamurthy et al. |
| 9,661,080 | B2 | 5/2017 | Haleem et al. |
| 10,362,116 | B2 | 7/2019 | Haleem et al. |
| 2007/0260884 | A1 | 11/2007 | Venkitaraman et al. |
| 2009/0147710 | A1 | 6/2009 | Choi et al. |
| 2010/0054275 | A1 | 3/2010 | Noonan et al. |
| 2014/0113556 | A1 | 4/2014 | Kotecha et al. |
| 2014/0287685 | A1 | 9/2014 | Griffin et al. |
| 2015/0264134 | A1 | 9/2015 | Dong et al. |
| 2015/0264627 | A1 | 9/2015 | Perdomo et al. |
| 2015/0281328 | A1* | 10/2015 | Bischoff ............... H04L 67/38 709/203 |
| 2015/0288655 | A1 | 10/2015 | Narasimhamurthy et al. |
| 2017/0214620 | A1 | 7/2017 | Haleem et al. |
| 2017/0257318 | A1 | 9/2017 | Haleem et al. |
| 2019/0038932 | A1* | 2/2019 | Eckblad ............. G09B 19/0038 |

OTHER PUBLICATIONS

U.S. Appl. No. 14/919,664 Office Action dated Apr. 6, 2016.
U.S. Appl. No. 14/919,664 Office Action dated Aug. 30, 2016.
U.S. Appl. No. 15/483,930 Notice of Allowance dated Apr. 17, 2019.
U.S. Appl. No. 15/483,930 Office Action dated Sep. 26, 2018.
U.S. Appl. No. 15/598,039 Notice of Allowance dated Dec. 5, 2018.
U.S. Appl. No. 15/598,039 Notice of Allowance dated Mar. 14, 2019.
U.S. Appl. No. 15/598,039 Office Action dated Oct. 4, 2018.

\* cited by examiner

| Field | Type | Description |
|---|---|---|
| fcf | u16 | Frame control field, FCF_ASSOC_REQ |
| seq | u8 | Frame sequence index |
| PANid | u16 | PAN ID for the network |
| destAddr | u16 | Bridge 120 address |
| srcAddr | u64 | Endpoint 110 MAC address |
| nonce | u8[4] | Random nonce, includes 24-bit rand and 8-bit time |
| cmd | u8 | MAC command byte, ASSOCIATION_REQUEST |
| NetJoinAsk | struct | Contains parameters for network join (encrypted with join key) |

FIGURE 8

| Field | Type | Description |
| --- | --- | --- |
| fcf | u16 | Frame control field, FCF_ASSOC_REQ |
| seq | u8 | Frame sequence index |
| PANid | u16 | PAN ID for the network |
| destAddr | u64 | Endpoint 110 MAC address |
| srcAddr | u16 | Bridge 120 address |
| nonce | u8[4] | Random nonce, includes 24-bit rand and 8-bit time |
| cmd | u8 | MAC command byte, ASSOCIATION_RESPONSE |
| NetJoinAns | struct | Contains parameters for network join (encrypted with session key) |

FIGURE 9

| Field | Type | Description |
|---|---|---|
| fcf | u16 | Frame control field, FCF_DATA |
| seq | u8 | Frame sequence index |
| PANid | u16 | PAN ID for the network |
| destAddr | u16 | short destination address |
| srcAddr | u16 | short source address |
| encType | u8 | encryption key type |
| nonce | u8[4] | Random nonce, includes 24-bit rand and 8-bit time |
| payload | u8[] | data being sent (encrypted with session key) |

SYSTEMS AND METHODS FOR SMART DEVICE NETWORKING

CROSS-REFERENCE TO RELATED APPLICATIONS

This application is a Continuation of U.S. patent application Ser. No. 15/483,930, filed Apr. 10, 2017, now U.S. Pat. No. 10,412,171, which is a Continuation of U.S. patent application Ser. No. 14/919,664, filed Oct. 21, 2015, now U.S. Pat. No. 9,661,080, which claims priority to U.S. Patent Application Ser. No. 62/066,678, filed Oct. 21, 2014, each of which is incorporated herein by reference in its entirety.

TECHNICAL FIELD

This invention relates generally to the computer networking field, and more specifically to new and useful systems and methods for smart device networking.

BACKGROUND

The modern internet has revolutionized communications by enabling computing devices to transmit large amounts of data quickly over incredibly vast distances. Over time, the internet has expanded beyond computers to include connectivity to a plethora of smart devices—from smartphones to tablets to connected appliances. The Internet of Things (IoT), one of the most recent expansions, brings connectivity to an even wider range of smart devices; but traditional methods of networking are ill suited to the inclusions of these new smart devices. Thus, there is a need in the computer networking field to create new and useful systems and methods for smart device networking.

BRIEF DESCRIPTION OF THE FIGURES

FIG. 8 is an example representation of a NetJoinAsk frame of a system of a preferred embodiment;

FIG. 9 is an example representation of a NetJoinAns frame of a system of a preferred embodiment;

FIG. 10 is an example representation of a data frame of a system of a preferred embodiment.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
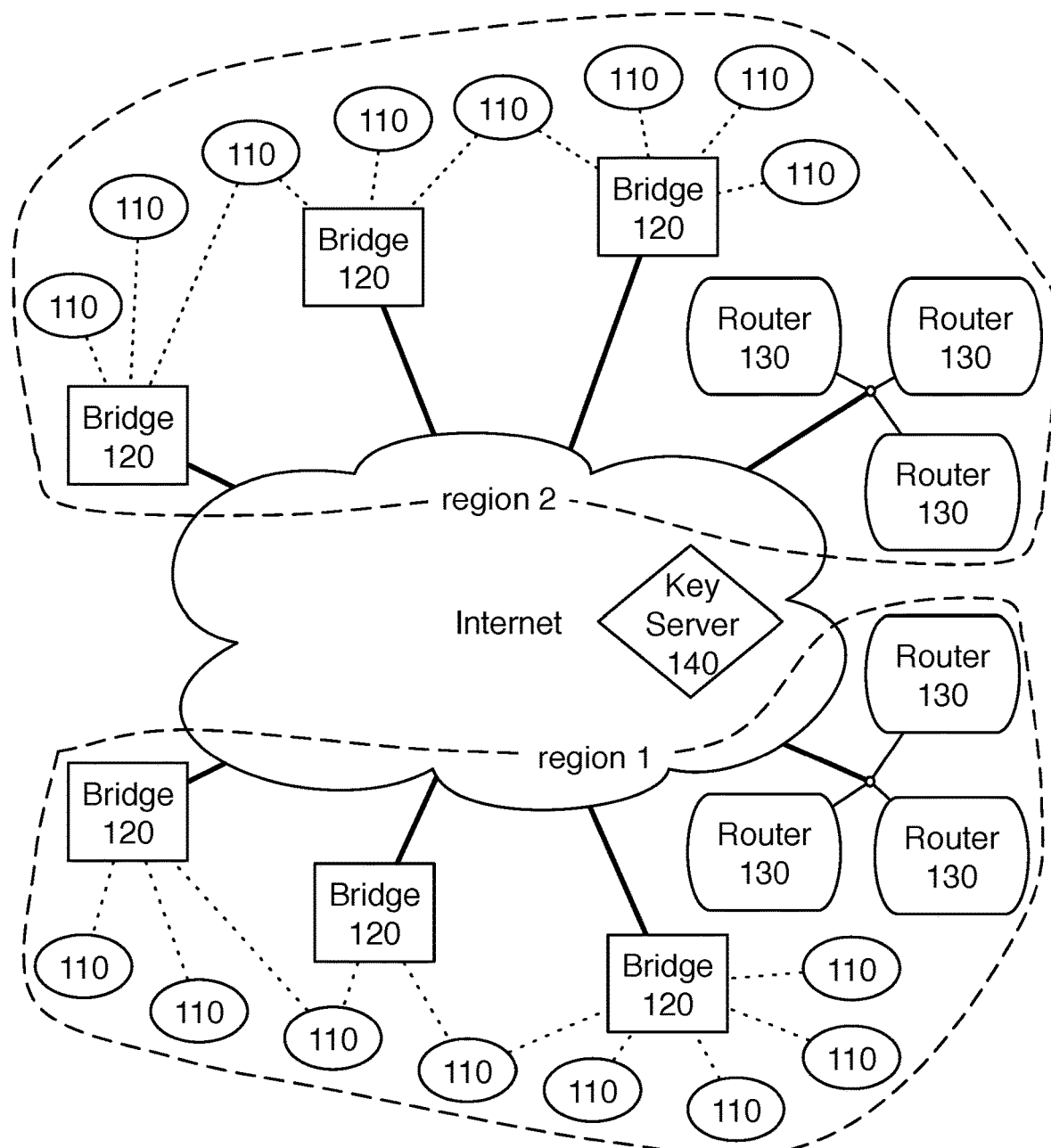
FIG. 1 is a diagram representation of a system of a preferred embodiment.
Figure 2:
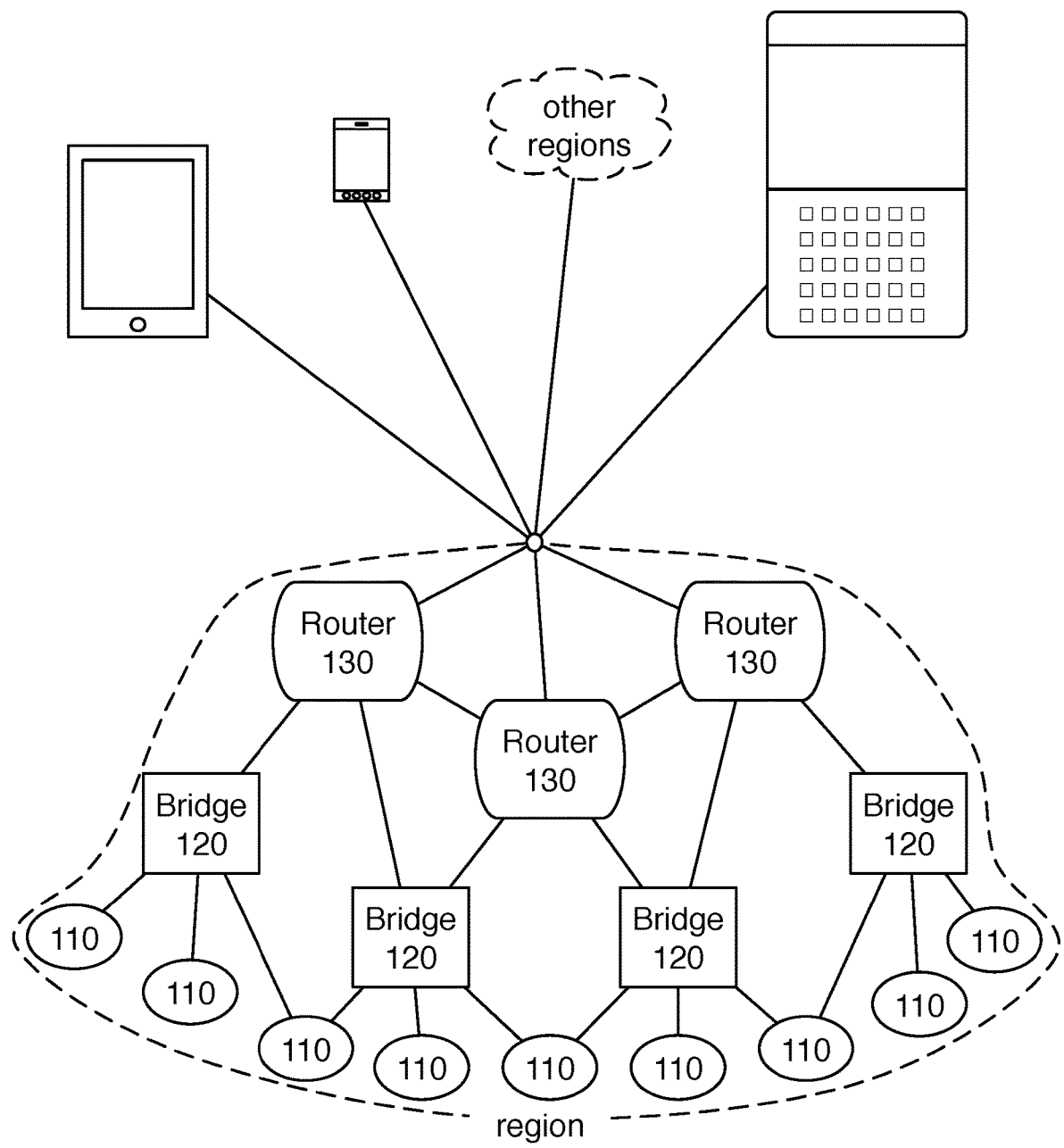
FIG. 2 is a diagram representation of a system of a preferred embodiment.

A system 100 for smart device networking includes pluralities of endpoints 110, bridges 120, and routers 130, as shown in FIGS. 1 and 2. The system may additionally include one or more key servers 140. The system 100 functions to provide internet access and intelligence to devices and is based on simple device connectivity, end-to-end security, low power requirements, low cost, and ease of development.

Advances in technology have enabled embedded technology to grow in computational power even as their physical size and cost shrinks, enabling embedded devices to find their way into more and more technological applications. Simultaneously with this development, wireless networking coverage (and thus wireless internet access) has steadily expanded, bringing the possibility of connectivity to many of these embedded devices. Together, these advances have enabled the rise of the Internet of Things (IoT). Research firms estimate that over 26 billion devices will be connected to the IoT by 2020, with some estimates topping 30 billion.

The Internet of Things has applications in almost every field of interest, with some of the most prominent applications finding use in environmental monitoring, infrastructure management, industrial applications, energy management, medical and healthcare systems, and building automation.

Unfortunately, traditional methods for wireless networking are in many ways woefully inadequate to handle IoT connectivity. Most wireless networking protocols are designed for relatively high bandwidths (to meet data transfer requirements of personal computers, tablets, smartphones, etc.) and need at least some amount of backwards compatibility, owing to the well-established position of wireless networking as a communication means for traditional computers. Additionally, these traditional methods are often designed for a relatively small number of devices; it's hard to imagine a home having two hundred personal computers, but if we imagine each sensor, switch, and appliance having connectivity, suddenly that number seems a lot smaller. Due to the compromises inherent in such traditional methods, traditional wireless networking suffers from limited range, complicated configuration, high power consumption requirements, and often limited security capabilities.

The system 100 serves to bring internet connectivity to sensors, actuators, and other devices without these compromises. Based on the principles that a system designed for IoT connectivity should be inexpensive, require a minimum of manual configuration, integrate hardware security, and have high coverage, long range, and low power consumption requirements, the system 100 is designed from the ground up to encourage the proliferation of connected smart devices.

The system 100 enables a flexible topology that allows computing power to be allocated where it is needed most—in some cases, the system 100 may operate to concentrate computing power in the cloud; this may be useful in situations where latency between smart devices and the cloud is not critical and/or in situations where the majority of data processing performed by the system requires a substantial amount of computing power.

However, in many cases, the system 100 may operate to distribute computing power to the edge of the network. Such an operation mode may be optimal for highly data-intensive or highly connected systems where relatively simple data processing can greatly reduce the amount of data that needs to be sent to the cloud; this may result in improved management of cloud processing resources as well as increased battery life at the edge of the network (through optimization of radio use).

Regardless of system operational mode, the use of intelligent endpoints within the system 100 enables easy transitions from one set of allocation parameters to another.

Internet connectivity for a device connected to the system 100 begins at an endpoint 110. The endpoint 110 is preferably connected to a single device and enables the device to communicate over a wireless network of the system 100. Each endpoint is preferably associated with an IPv6 address, enabling easy addressing. The endpoint 110 connects wirelessly to one or more bridges 120; the bridges 120 receive data from the endpoint 110 and pass it on, preferably through the internet, to one or more routers 130. The routers 130 analyze the content of the data and route it to its intended destination. Data is encrypted before leaving the endpoint 110 and remains encrypted until processing at the router 130, minimizing the likelihood of successful interception; and although in many instances the system passes traffic between the bridges 120 and routers 130 over the internet, for sensitive data the system 100 may be run entirely on-premise.

Figure 3:
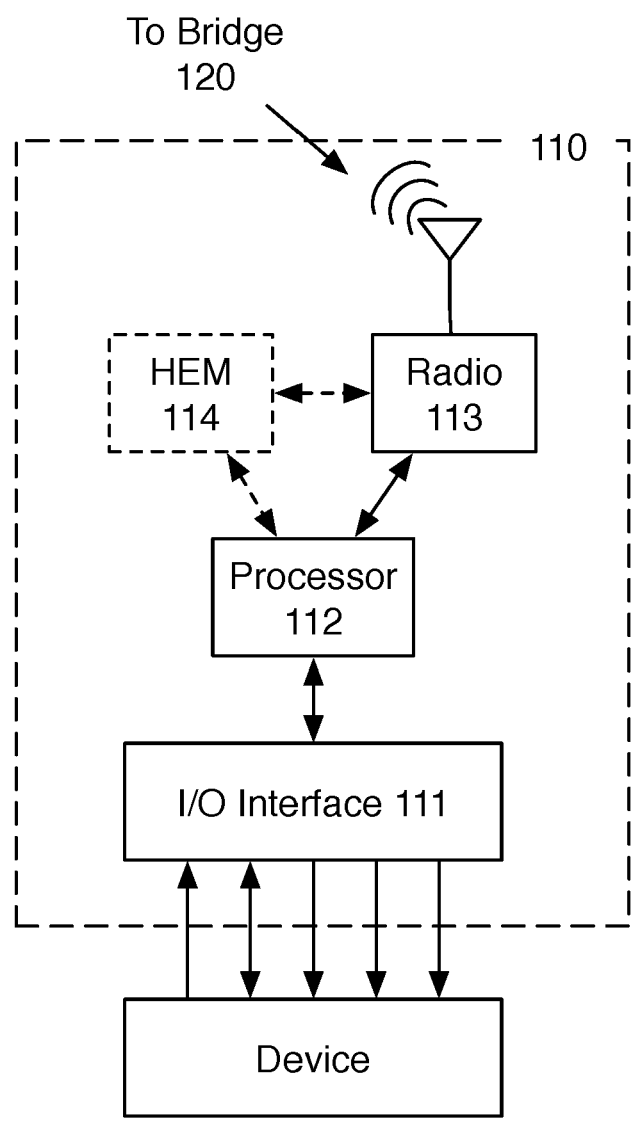
FIG. 3 is a diagram representation of an endpoint of a system of a preferred embodiment.

The endpoint 110, as shown in FIG. 3, functions to receive data from a device, prepare the data for transmission, and transmit the data wirelessly (preferably over a personal area network) to a bridge 120 or other device. Additionally or alternatively, the endpoint 110 may perform the opposite task: receiving data wirelessly from a bridge 120, preparing the data to be read or otherwise acted upon by a device, and transmitting the data to the device.

The endpoint 110 preferably is capable of bidirectional communication, but may additionally or alternatively be capable only of unidirectional communication.

The endpoint 110 preferably includes a device interface 111, a processor 112, and a radio 113. The endpoint 110 may additionally or alternatively include any number of device interfaces 111, processors 112, and radios 113.

The device interface 111 functions to enable communication between the endpoint 110 and a device connected to the system 100. The device interface 111 preferably communicates with the endpoint 110 over one or more data connections. Data transmitted from the device is preferably transmitted as analog or digital electrical signals, but may additionally or alternatively be transmitted in any suitable way (e.g., optically, sonically, RF wirelessly). Data may be transmitted using known bus standards such as I2C or SPI, over JTAG connectors, over GPIO connectors, over serial connections using RS-232 or other standards, or in any suitable manner. Data may also be transmitted as analog signal data to be converted according to instructions provided to the interface 111 or the processor 112, or in any other suitable manner. Data lines connected to the device interface 111 may be unidirectional or bidirectional.

The device preferably communicates with the device interface 111 according to a known and open standard, but may additionally or alternatively communicate with the device interface in any suitable way. For example, if the endpoint 110 is connected to an analog sensor, the endpoint 110 may dictate how the data is sampled and processed from the sensor. Likewise, if the endpoint 110 is connected to an actuator, the endpoint 110 may dictate what signal is sent to control actuation of the actuator.

The device interface 111 may perform processing before passing data to the processor 112; for example, the device interface 111 might include an I2C/SPI to USART bridge. As another example, the device interface 111 might include an analog-to-digital converter (ADC); this might be useful in the example where the device is an analog sensor. Additionally or alternatively, this processing may occur at the processor 112.

Endpoints 110 designed for particular applications preferably include custom device interfaces 111 intended for a specific type of data transmission; endpoints 110 may additionally or alternatively include general device interfaces 111 that feature a number of different data transmission options.

The processor 112 functions to process data transmitted or received by the endpoint 110; data processed by the processor 112 may originate from either the device interface 111 or the radio 113 (or from any other suitable source). The processor 112 is preferably a microcontroller, but may additionally or alternatively be any suitable type of microprocessor or other processing unit. The processor 112 preferably processes data according to instructions in stored firmware and/or software, but may additionally or alternatively process data according to any other suitable instructions. In some cases, the processor 112 may simply forward data from the interface 111 to the radio 113 or vice versa, potentially changing only the data format or signaling method. In other cases, the processor 112 may perform more processing on data before sending it or after receiving it; for example, if the processor 112 is connected to an analog temperature sensor and an analog humidity sensor, the processor 112 may sample both sensors at identical time intervals and pass along both readings along with time data.

In one implementation of a preferred embodiment, the processor 112 stores historical data transmitted over the device interface 111 and makes decisions about how to respond to current data based on stored historical data and/or other instructions stored in firmware and/or software. For example, the processor 112 may transmit differential values (potentially after transmitting a first absolute value) for measurements taken by a sensor coupled to the device interface 111. In this example, the processor 112 may only transmit differential values over the PAN radio 113 when they exceed a threshold (e.g., temperature changes by more than 0.1 degrees Celsius). By reducing the number of transmissions made by the PAN radio 113, the processor 112 may extend endpoint 110 battery life. Additionally or alternatively, the processor 112 may perform any suitable processing to reduce the number of transmissions made by the PAN radio 113.

As another example, the processor 112 may store and transmit all of a set of data, but batch the set of data according to properties of said data. For example, the processor 112 may store all readings taken by a sensor coupled to the device interface 111, but transmit those readings only when a trigger (e.g., threshold change over historical value or over historical average exceeded) occurs. Unlike the previous example, this example may not result in substantially less data transmitted, but it still may result in more efficient radio usage.

The response of the processor 112 may be particularly important in cases where a low-latency response by the system 100 to some event is required. In traditional cloud-intelligence systems, the endpoint is often helpless to make decisions when the cloud provides crucial data or instructions too slowly. In some cases, this may be mitigated by pre-storing some responses to certain scenarios at the endpoint, but maintaining these pre-stored responses across endpoints may be a difficult challenge as the complexity of the response increases (and varies at a per-endpoint level).

In one implementation of a preferred embodiment, the processor 112 stores both data patterns (e.g., sets of data received or transmitted over the device interface 111) and instructions received from the router 130 in response to those data patterns (as transmitted to the router 130). In this implementation, the processor 112 may identify repeated instances of data pattern/instruction correlation. After a confidence threshold is met, the processor 112 may use these correlations as backup instructions when instructions from the cloud are not readily available. In this manner, the processor 112 may be able to respond to scenarios that would normally require either manual configuration of the endpoint and/or complex computation without the performance of either manual configuration or complex computation. For endpoints 110 with similar functions, these responses may be shared across endpoints. For example, an endpoint 110 may be coupled to a current monitor that monitors current flowing to a refrigerator, an actuator that activates or deactivates the refrigerator's compressor, and several temperature sensors within the refrigerator. The endpoint 110 regularly transmits data from the current monitor and the temperature sensors to an external server (via the router 130). Sometimes, the refrigerator malfunctions and the compressor needs to be cycled to maintain appropriate temperature in the refrigerator; this is programmed in the external server. Eventually, the endpoint 110 associates a pattern of current reading differences with the compressor cycling command (typically sent by the external server to the endpoint 110, and then accomplished via the actuator). Now, the endpoint 110 can perform that operation automatically if there is a delay (or even just if the typical response is slower than ideal) between the recognition of the particular current reading pattern and the actuation of the compressor actuator. Such pattern recognition may be accomplished using machine learning or any other suitable technique.

Figure 4:
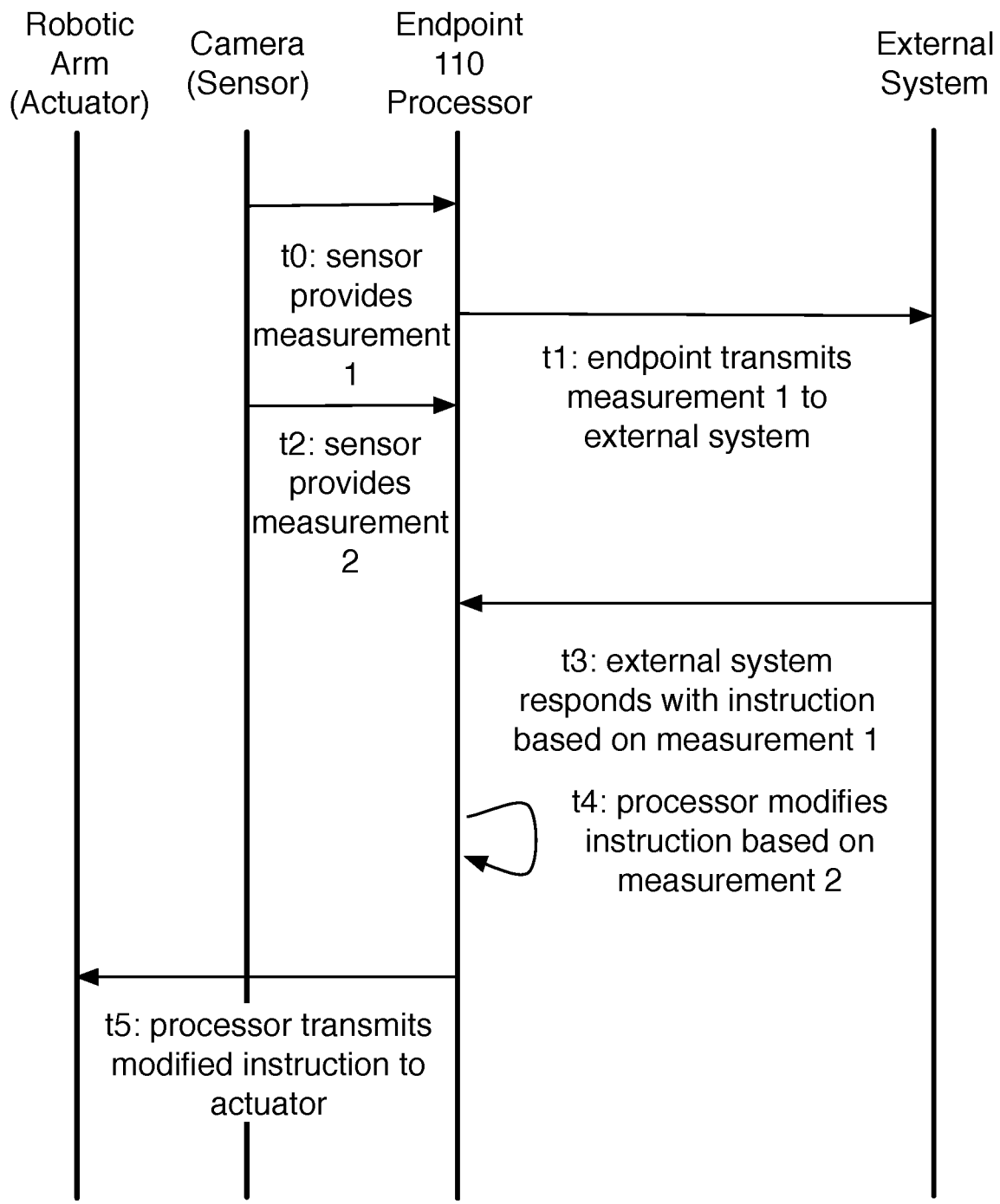
FIG. 4 is a swim lane diagram representation of instruction modification by a processor of an endpoint of a system of a preferred embodiment.

The processor 112 may also modify instructions received via the router 130 based on latency and/or other data received by the processor 112. For example, the endpoint 110 may be connected to a robotic arm and a machine vision system. The robotic arm is directed to move to a particular target being imaged by the machine vision system; obviously, the instructions given have a dependence on the range between the arm and the target as imaged. An external system provides instruction to the endpoint 110 to move the arm based on the current position of the arm and the received data from the machine vision system, but during the time the imaging data is sent from the machine vision system and the time the instruction is received at the robotic arm, the target may have moved, resulting in the robotic arm being moved to an inaccurate position. As shown in FIG. 4, the endpoint processor 112 may modify the instruction received from the external system based on updated data from the machine vision system. Such a system may be particularly useful in situations where complex or resource-intensive algorithms are required to make decisions based on input data, but a simpler algorithm could be used to interpolate or extrapolate new decision data from small changes to input data. Note that in the endpoint processor 112 may modify instructions based on any relevant data, not just updated sensor data. For example, the endpoint processor 112 may modify instructions based on latency itself. For example, an external system might send a command "ramp down lathe RPM from 1000 rpm to 100 RPM in 1000 ms"; if, for this particular system, the final RPM being set at the appropriate time is more important than the actual ramp, the processor 112 may modify the command sent to the lathe to look more like "ramp down lathe RPM from 1000 rpm to 100 RPM in (1000-latency) ms".

A person of ordinary skill in the art will recognize that the techniques described in the preceding examples may be combined in any manner. The processor 112 may process data received or transmitted over the device interface 111 in any manner.

The processor 112 firmware and/or other endpoint 110 firmware are preferably flash-able over the air (OTA), allowing updates to reach the endpoint 110 without manual or individual configuration.

The processor 112 preferably also performs power management for the endpoint 110. In particular, the processor 112 preferably puts the endpoint 110 into a sleep mode after a period of inactivity (or according to a set schedule). The processor 112 is preferably also able to put the endpoint 110 to sleep (putting the device interface 111, processor 112, and radio 113 into low-power consumption modes) according to a command. When the endpoint 110 is sleeping, it preferably draws only a few microamps of current. Upon awakening, the endpoint 110 is immediately able to send and receive data, unless the bridge 120 that the endpoint was connected to is no longer available. In that case, the endpoint 110 preferably automatically connects to an available bridge 120.

The processor 112 preferably also serves to establish connectivity between the endpoint 110 and the bridge 120. When the endpoint 110 is first powered on or wakes up from sleep, the processor 112 preferably directs the endpoint 110 to search for available bridges 120 (over the radio 113). When the endpoint 110 finds an available bridge 120, it preferably sends data to the bridge 120; if the endpoint 110 receives an acknowledgment (e.g., an ACK packet) from the bridge 120, the endpoint has successfully associated with a particular bridge 120. This process is described in more detail in sections discussing connectivity between the endpoint 110 and bridge 120.

The processor 112 may additionally control messaging parameters for the endpoint 110. For example, the endpoint 110 may operate using carrier sense multiple access (CSMA); the endpoint 110 checks to see if another device is transmitting on the endpoint 110's transmit channel before transmitting and preferably waits until no other devices are transmitting on the transmit channel to send a message (e.g., listen before talk (LBT)).

The processor 112 may set messaging parameters to aid with power management, for example, the endpoint 110 may wake up at set time intervals, transmit data, and then stay active for a period of time after transmission before shutting off again. This time period is preferably communicated to the router 130 or bridge 120 (or set by the router 130 or the bridge 120), such that the system 100 knows to send any relevant information to the endpoint 110 during its 'on period' following data transmission. In one implementation of a preferred embodiment, the endpoint 110's on period may be extended; for example, explicitly after receiving "keep awake" flags from the bridge 120, or implicitly during multicast mode transmissions from the bridge 120.

In one implementation of a preferred embodiment, the processor 112 modifies power management parameters (e.g., wake up intervals) based on data received over the device interface 111 and/or data received over the PAN radio 113. For example, the processor 112 may activate the radio 113 more or less based on the differential between sensor measurements received over the device interface 111 (e.g., batching intervals may be longer for sensors reporting lower change than for sensors reporting higher change). As another example, the processor 112 may activate the radio 113 more or less based on the frequency or type of commands sent to the endpoint 110 via the bridge 120. For example, if the primary task of an endpoint 110 is to communicate a particular set of data or perform an action when requested via the bridge 120, the processor 112 may modify wake-up intervals based on how frequently data or action performance is requested. Further, to the extent that the endpoint 110 learns responses over time (e.g., as described in the section regarding data pattern/instruction correlation), the processor 112 may increase periods between wake-up as less instruction may be needed from an external source.

The radio 113 serves to enable wireless connectivity between the endpoint 110 and one or more bridges 120. The radio 113 preferably includes an RF transceiver and communicates using an antenna coupled to the endpoint 110. The antenna may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The radio 113 is preferably a dual-band radio with the first band operating on one of the 868 MHz frequency band and 915 MHz frequency band, and the second band operating on the 2450 MHz frequency band. Additionally or alternatively, the radio 113 may operate at any suitable number of bands at any suitable frequencies (e.g., 782 and/or 779 MHz).

The radio 113 preferably transmits and receives data according to the IEEE 802.15.4 standard, but may additionally or alternatively transmit and receive data according to any standard (or no standard at all). The radio 113 preferably connects to the bridge 120 wirelessly over a personal area network (PAN) but may additionally or alternatively connect to the bridge 120 in any suitable manner.

The endpoint 110 may additionally include a hardware encryption module (HEM) 114. The HEM 114 is preferably a chip that stores a 256-bit encryption key securely (e.g., the Atmel SHA204) and performs data encryption based on that key, but may additionally or alternatively be any hardware module capable of encrypting transmissions from and/or decrypting transmissions to the endpoint 110. The encryption process is described in more detail in sections discussing connectivity between the endpoint 110 and bridge 120.

The endpoint 110 is preferably integrated fabricated with integrated circuits (ICs) coupled to printed circuit boards (PCBs) but may additionally or alternatively be fabricated in any suitable manner.

The bridge 120 functions to provide connectivity between the endpoint 110 to the router 130. The bridge 120 preferably creates a personal area network (PAN) to communicate with endpoints 110, connects to one or more routers 130 via the internet, and enables traffic to flow between the two. In some variations, the bridge 120 may connect to routers 130 via a local-area network (LAN).

The bridge 120 preferably acts a stateless gateway for the endpoints 110. When packets are sent to the bridge 120 from an endpoint 110 on the bridge's PAN, the bridge 120 preferably directs the packet appropriately to a router 130. This may include encapsulating the packet into another packet, modifying the packet header, and/or any other packet processing required for transmission from the bridge 120 to a router 130. For example, if the packet is an 802.15.4 packet, the bridge 120 may encapsulate that packet into a TCP/IP packet before sending it to the router 130. The packet payloads are preferably encrypted, and the bridge 120 preferably does not perform any decryption; but the headers of the packets are preferably not encrypted. Additionally or alternatively, the packets may be encrypted in any other manner (or not at all), and/or the bridge 120 may perform decryption.

In a variation of a preferred embodiment, the bridge 120 may be capable of storing data, providing or verifying security credentials, and performing compute operations (e.g., allowing offload of computation from the endpoint 110 and/or other systems).

Figure 5:
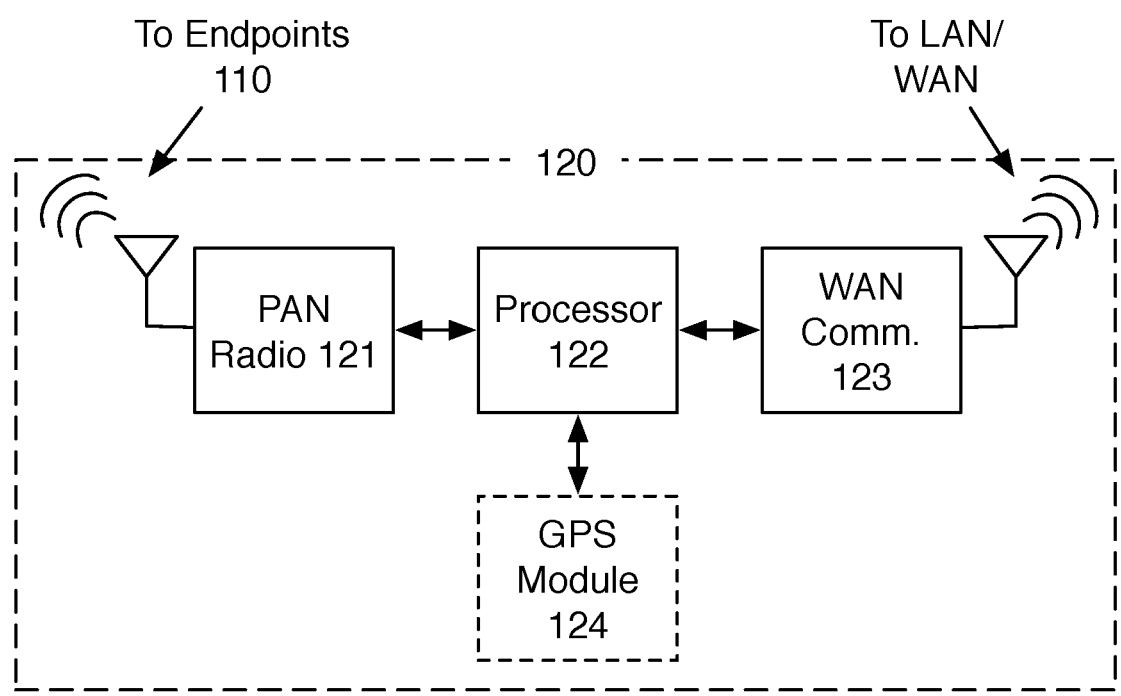
FIG. 5 is a diagram representation of a bridge of a system of a preferred embodiment.

The bridge 120 preferably includes a PAN radio 121, a processor 122, and a WAN communications module 123, as shown in FIG. 5. The bridge 120 may additionally or alternatively include a GPS module 124.

The PAN radio 121 functions to create a PAN for communication with one or more endpoints 110. The PAN created by the PAN radio may additionally or alternatively be used for communication with other bridges 120. The PAN radio 121 preferably includes an RF transceiver and communicates using one or more antennas coupled to the PAN radio 121. The antenna may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The PAN radio 121 preferably includes multiple antennas and uses antenna diversity to increase PAN network reliability. The antennas may use one or more types of antenna diversity, including spatial diversity (e.g., physical separation or isolation of antennas), pattern diversity (e.g., using antennas with different radiation patterns), polarization diversity (e.g., using antennas with orthogonal polarizations), and/or transmit/receive diversity (e.g., using separate antennas for receiving and transmitting). The antennas may additionally or alternatively be modifiable (e.g., tunable) to adjust electrical characteristics of the antennas. The antennas may be used as part of multiple-in multiple-out (MIMO) communication.

The PAN radio 121 is preferably a dual-band radio with the first band operating on one of the 868 MHz frequency band and the 915 MHz frequency band, and the second band operating on the 2450 MHz frequency band. Additionally or alternatively, the PAN radio 121 may operate at any suitable number of bands at any suitable frequencies (e.g., 782 and/or 779 MHz).

The PAN radio 121 preferably transmits and receives data according to the IEEE 802.15.4 standard, but may additionally or alternatively transmit and receive data according to any standard (or no standard at all).

The PAN radio 121 preferably establishes a PAN on a single wireless channel in the frequency bands previously mentioned, but may additionally or alternatively establish PANs on multiple wireless channels. The PAN radio 121 is preferably able to hop between channels for a given frequency band (or potentially even across frequency bands) in order to choose channels having a minimum of unwanted noise. The PAN radio 121 may hop channels in response to environmental conditions (e.g., the detection of noise above some threshold, congestion, etc.), may hop channels after a set time interval, and/or may hop between channels in response to any other conditions.

The bridge 120 preferably includes a single PAN radio 121 but may additionally or alternatively include multiple PAN radios 121 in order to increase connectivity options. For example, the bridge 120 may include two 802.15.4 radios or one 802.15.4 radio and one Bluetooth radio.

The processor 122 functions to process data transmitted or received by the bridge 120; data processed by the processor 122 may originate from the PAN radio 121, the WAN comm. module 123, interface 111 or from any other suitable source. The processor 122 is preferably a microcontroller, but may additionally or alternatively be any suitable type of microprocessor or other processing unit. The processor 122 preferably processes data according to instructions in firmware and/or software, but may additionally or alternatively process data according to any other suitable instructions.

The processor 122 preferably performs any change in data format or header format for data passing between the endpoint 110 and the router 130. In one embodiment, the processor 122 preferably encapsulates 802.15.4 packets sent by the endpoint 110 in TCP/IP packets before forwarding the packets to the router 130 and also strips TCP/IP encapsulated packets received from the router 130 before forwarding them to the endpoint 110.

The processor 122 may additionally be used for frame-checking purposes; that is, the bridge 120 may check frames received from endpoints 110 for errors using error checking bits contained within the frames. Additionally or alternatively, frame checking may occur at the router 130.

The processor 122 preferably also performs power management for the bridge 120, including determining when radios are on, which antennas are used, sleep state settings, and any other setting relevant to power management of the bridge 120.

Figure 11A:
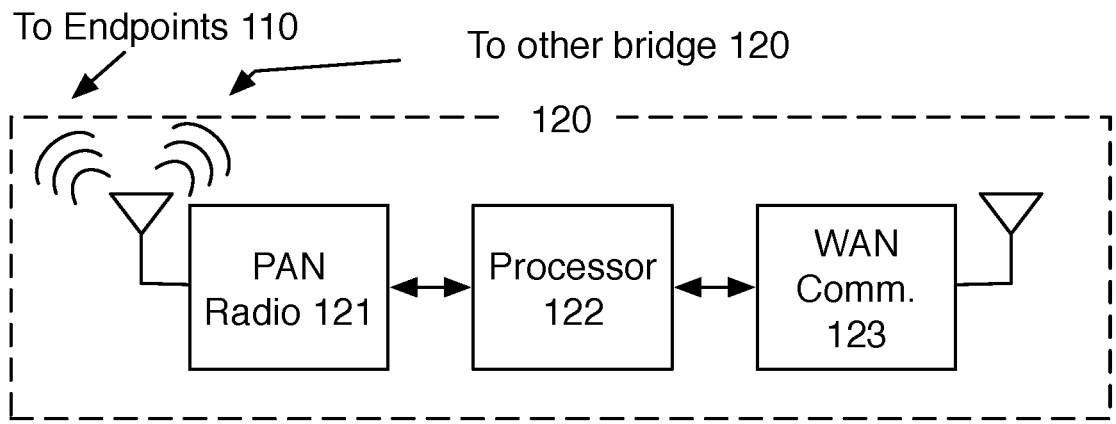
FIGS. 11A and 11B are diagram representations of a bridge of a system of a preferred embodiment.

The processor 122 preferably also serves to establish connectivity between the bridge 120 and one or more routers 130. After any connection interruption (including a power-off state), the processor 122 preferably seeks to establish a TCP/IP connection between the bridge 120 and a router 130. If the TCP/IP connection is irreparable, the processor 122 may attempt to establish a multi-hop or mesh connection using its own PAN connection or another PAN to PAN connection, as shown in FIG. 11A.

The bridge 120 preferably attempts to sustain a TCP/IP connection to at least one router 130 at all times; if the TCP/IP connection is interrupted, the bridge preferably attempts to immediately remedy the interruption. The bridge 120 preferably differentiates between interruptions between the bridge 120 and the router 130 (e.g., an interruption occurring from loss of bridge internet connection) and interruptions at the router 130 (e.g., router failure). In the case that a router 130 has failed, the bridge 120 preferably switches to another router 130.

Figure 11B:
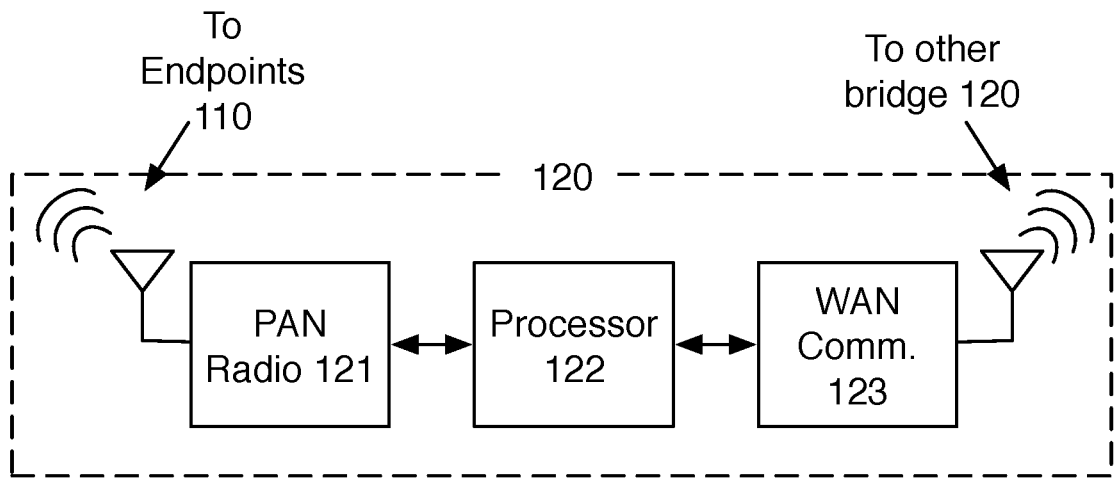

The WAN communications module 123 functions to connect the bridge 120 to the router 130. The WAN communications module 123 preferably connects the bridge 120 to the router 130 over the internet or other WAN, but may additionally or alternatively connect the bridge 120 to the router 130 over a LAN. The WAN communications module 123 preferably includes a cellular radio, enabling the WAN communications module 123 to communicate with routers 130 over existing cellular networks. The WAN communications module 123 may additionally or alternatively include any other suitable connection hardware to enable connection with routers 130, including Ethernet modules, Wi-Fi radios, Bluetooth radios, and any other WAN or LAN connection module. In a variation of a preferred embodiment, the WAN communications module may include a radio for communicating with another bridge 120 (e.g., over a multi-hop or mesh connection) as shown in FIG. 11B.

The WAN communications module 123 preferably also enables configuration of the bridge 120. For example, the bridge 120 may be configured locally using an iPhone or Android phone connecting to the bridge over a Bluetooth connection. The bridge 120 may additionally or alternatively include any suitable mechanism to allow configuration from a source other than a router 130; for example, a USB port to allow for connection of a configuring device (e.g., a smartphone, laptop, or dedicated configuration device).

The GPS module 124 functions to provide location data to the bridge 120. The bridge 120 preferably uses location information derived from the GPS module 124 for one or both of two purposes.

The first purpose involves determining appropriate whitespace for the PAN radio 121. The bridge 120 preferably contains data corresponding location with acceptable broadcast spectra, allowing the bridge 120 to operate in multiple regulatory environments without pre-knowledge of the area it will be used in. The bridge 120 preferably checks location using the GPS module before establishing a PAN network to determine allowed broadcast spectra; after the bridge 120 has determined an allowed broadcast spectrum, the bridge 120 preferably broadcasts on that spectrum.

Note that broadcast spectra may be set according to other criteria as well. For example, the bridge 120 may operate in a region where the regulatory environment allows for communication over multiple spectra that the bridge 120 is capable of broadcasting on. In this example, the bridge 120 may scan the allowed broadcast spectra and choose one of the spectra (or more than one) based on the results of the scan (e.g., the bridge 120 chooses to broadcast on the less congested of two broadcast bands).

The second purpose involves determining appropriate router 130 region (discussed in more detail in later sections). The bridge 120 preferably uses GPS information from the GPS module 124, along with data containing router 130 locations or router region data, to determine appropriate routers 130 to connect to. Additionally or alternatively, the bridge 120 may determine appropriate routers 130 to connect to by any other suitable method (e.g., selecting the router with the lowest ping regardless of location).

The bridge 120 may additionally include other equipment for increasing network reliability. For example, the bridge 120 may include a backup battery in case power to the bridge 120 is lost.

The router 130 functions to mediate communication occurring within the system 100. The router 130 is in some ways the 'brain' of the system 100; the router 130 determines what communication may occur between an endpoint 110 and another device (whether that device is internal or external to the system 100), performs endpoint 110 management and addressing, and may even manage bridge 120 operations.

The router 130 preferably operates using a general-purpose computer server as a host, but may additionally or alternatively run on specialized hardware (e.g., switches) or any suitable computing system. The router 130 is preferably located in high-uptime data center along with other servers, but may additionally or alternatively be located in any suitable area.

Routers 130 are preferably organized into regions; these regions preferably correspond to geographic regions but may additionally or alternatively correspond to any other type of region (e.g., regions may be based on population regions). Routers 130 located in a particular region preferably are able to connect to many devices of the system 100 (i.e., bridges 120, and through bridges 120, endpoints 110) with low latency. Decreasing latency may be one of the criteria for determining regions in addition to population and/or geography. Stated alternatively, one of the advantages of locating routers 130 according to regions is that routers 130 of a particular region preferably have lower latency or higher reliability connections to the devices associated with that region than they would if the routers 130 were located in central locations for all regions.

Regions also a play a role in endpoint 110 addressing. Endpoints 110 are preferably assigned virtual IPv6 addresses by routers 130; the IPv6 addresses are preferably generated from both an endpoint 110's unique MAC address and an IPv6 prefix corresponding to the region associated with the endpoint 110. For example, an endpoint 110 with MAC address a1b2.a2b3.a235 in a region associated with an IPv6 prefix of 2001:odb8:85a3:0000 might receive a virtual IPv6 address of 2001:odb8:85a3:0000:0000:a1b2.a2b3.a235, alternatively written as 2001:db8:85a3::a1b2.a2b3.a235.

Information about the endpoints 110 connected to routers 130 in a particular region is preferably stored in a hash table distributed across the routers 130 of that region. Additionally or alternatively, the information (e.g., Endpoint MAC address, last seen time, bridge connection, etc.) may be stored in any suitable location or format. The distributed hash table of a region may include other information relevant to the system 100; for example, bridge 120 channel settings or any other suitable data. Key data (or even all data) from the distributed hash table may be cached in router 130 memory to enable fast access to data.

Regions are preferably designed to have N+1 redundancy, so that if a router 130 in a region fails, that router's responsibility is transferred over to another router 130 in the region. Likewise, the distributed hash table preferably shares this redundancy (that is, it can be completely reconstructed in the event of a router 130 failure). If multiple failures occur across a region, the system 100 preferably enables the transfer of operations from one region to another.

The key server 140 preferably functions to store 'super secret keys' associated with endpoints 110 for purposes of encryption. The key server 140, like the routers 130, preferably operates using a general-purpose computer server as a host, but may additionally or alternatively run on specialized hardware (e.g., switches) or any suitable computing system. Unlike the routers 130, the key server 140 is preferably centralized (i.e., not located in the same edge-of-the-internet data centers as the routers 130); additionally or alternatively, key servers 140 may be co-located with routers 130 or may exist in any suitable location. The super secret keys are preferably used as described in following sections; the key server 140 may additionally or alternatively store any other sensitive information related to system 100 security.

The following sections describe methods of communication on the system 100, including network setup routines. Specifically, bridge setup routines, endpoint setup routines, and communication methods (including encryption) will be discussed in respective order.

When a bridge 120 is first connected to the internet, (or other network), the bridge 120 attempts to find a router 130 to connect to. The bridge 120 preferably searches for routers by contacting routers on a list stored within the bridge 120; additionally or alternatively, the bridge 120 may first request such a list from a central server of the system 100. The bridge 120 preferably connects to a router 130 based on the results of contact; for example, a bridge 120 might connect to a router 130 by contacting a list of routers 130 and selecting the one with the lowest response latency. Additionally or alternatively, the bridge 120 may connect to a router 130 based on any other suitable information; for example, the bridge 120 may request connections from a group of routers 130. The routers 130 may then communicate to each other to determine which router 130 the bridge 120 should connect to (e.g., based on router load); that router 130 preferably then responds to the bridge. Other information may also include GPS information from the bridge GPS module 124; for example, the bridge 120 may only request to join or may only join routers 130 associated with a particular geographic region.

Once the bridge 120 has selected a router 130, the bridge 120 preferably opens a TCP/IP socket connection with the router 130. The TCP/IP socket connection is preferably encrypted (e.g., by TLS/SSL). After the TCP/IP connection has been established, the bridge 120 preferably maintains the connection at all times. If the connection is severed for some reason, the bridge 120 preferably immediately attempts to reestablish the connection (described in sections detailing the bridge 120). The bridge 120 may additionally or alternatively open a connection to one or more backup routers 130 (or may simply have them listed as particular backup options to try if the primary router 130 fails). The bridge 120 may additionally or alternatively attempt to connect using multi-hop or mesh networking over a PAN connection. During this process, the bridge 120 may be assigned an identifier in distributed hash tables stored by the routers 130. The bridge 120 may additionally or alternatively provide information about itself; for example, a bridge 120 may transmit its GPS coordinates or results of a radio scan of the area the bridge 120 is located in.

The bridge 120 preferably also begins broadcasting a PAN to allow endpoints 110 to connect to the bridge 120. The bridge 120 may choose the PAN channel and communications settings (e.g., bit rate, channel width, etc.) based on internal rules stored within the bridge 120, additionally or alternatively, the bridge 120 may choose these settings according to instructions from the router 130 the bridge 120 is connected to.

When an endpoint 110 is powered on, the endpoint 110 preferably immediately searches for one or more bridges 120 across a wireless spectrum defined by the endpoint 110. Once the endpoint 110 finds a bridge 120 to connect to, the endpoint 110 preferably sends a network join request to the bridge 120. This network join request is preferably forwarded to a router 130 by the bridge 120. Once the network join request has been received by the router 130, the router 130 preferably uses identifying information stored within the network join request (e.g., the source address in the frame header) to look up the endpoint 110 in a distributed hash table associated with the router region. If the endpoint 110 is not found within the router region's distributed hash table, the router 130 will contact routers 130 in other regions to determine if the endpoint 110 has moved regions; if the endpoint 110 has moved regions, the distributed hash table of the previous region is preferably updated. In either case, an entry is preferably created within the distributed hash table of the current region if the router 130 accepts the endpoint 110's join request. Further, the router 130 preferably then sends a join acknowledgment to the endpoint 110. The router 130 may additionally assign a transmission timeslot to the endpoint 110 (based on other transmission timeslots for a given bridge 120 or group of bridges 120).

While this describes in general the endpoint 110 connection process, the process preferably includes encryption. The encryption protocol for the system 100 preferably enables the system 100 to perform encryption that satisfies the following:

a. Allows endpoints 110 to verify that the network they are connecting to is the genuine network of the system 100, b. Allows the system 100 to verify that an endpoint 110 connecting to the system is a known entity (the system 100 preferably does not allow unauthorized access), c. Guards against the possibility of replay attacks, d. Encrypts each packet with a different key value such that sending the same data packet repeatedly does not give clues to the packet contents, e. Encrypts the payload, but not the header, of transmitted frames (as in the 802.15.4 standard), and f. Allows newly manufactured devices to join the network without encryption keys being discoverable by eavesdroppers.

The encryption protocol is preferably based upon AES256 encryption, but may additionally or alternatively use any suitable encryption scheme. In addition to standard AES256 encryption considerations, the encryption scheme is preferably structured such that if any endpoint 110 or bridge 120 were to be reverse-engineered, that the damage would be limited to only that endpoint 110 or bridge 120 (or alternatively, a small set of endpoints 110 or bridges 120. In other words, each device performing encryption preferably has a separate secret key used for generating encryption keys. Alternatively, any number of devices may share secret keys. Secret keys for endpoints 110 are preferably stored within the HEM 114.

Figure 6:
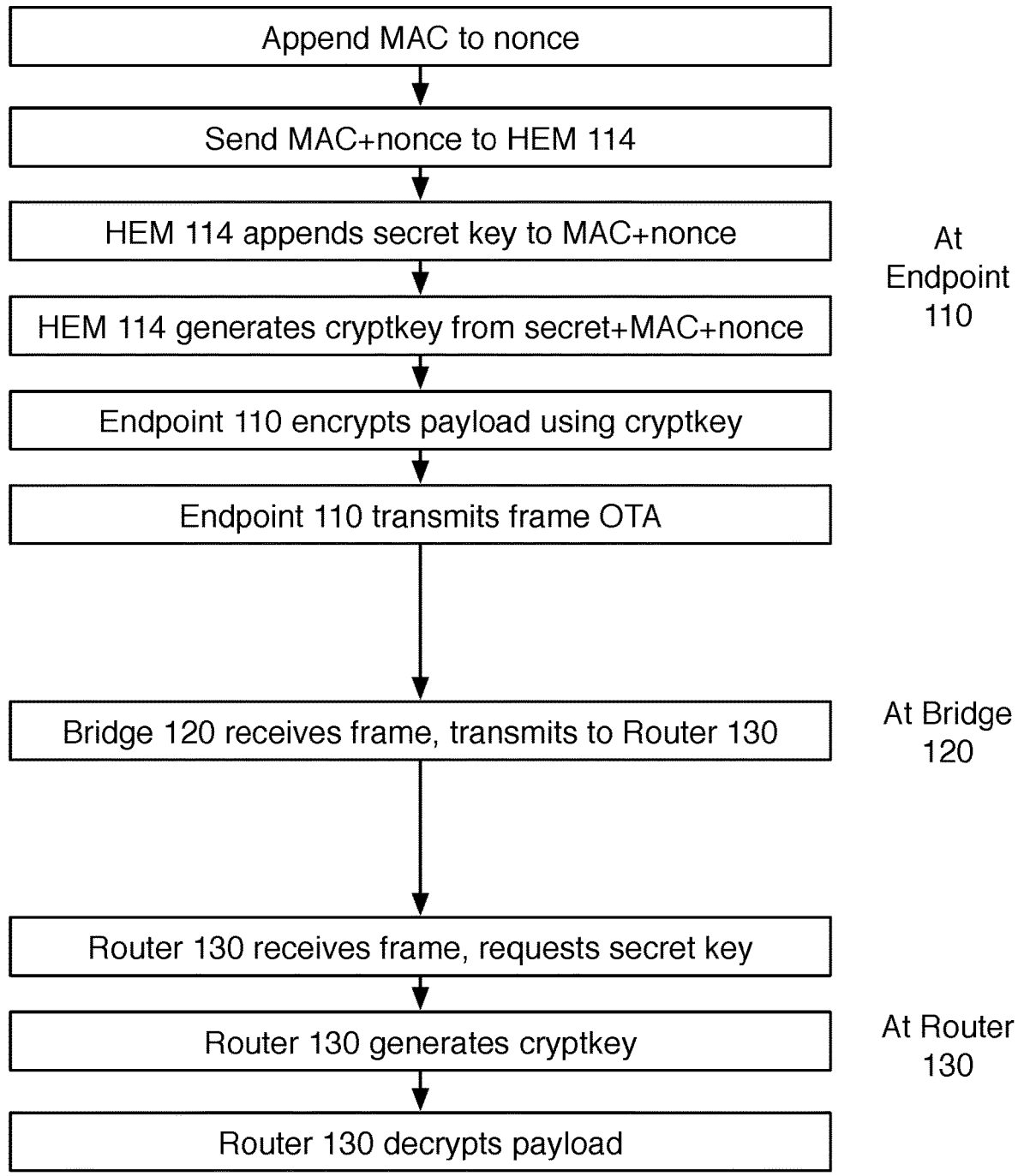
FIG. 6 is a flowchart representation of an encryption method.

As shown in FIG. 5, a first encryption approach begins when the endpoint 110 sends a frame, the endpoint 110 preferably begins by appending the endpoint 110's MAC address (or other identifier) to a nonce; a nonce serving as a counter that is incremented once every data frame. (Note that alternatively, the nonce may be appended to the MAC address, or the two may be combined in any other manner). Then, the endpoint 110 transmits the MAC+nonce value to the HEM 114, which appends a secret key to the MAC+nonce value (likewise, the secret key may be combined with the MAC+nonce value in any manner). The secret+MAC+nonce value is then used as input to a key-generating algorithm (preferably SHA256) in the HEM 114 to produce an encryption key that can be used to encrypt the frame. Once the encryption key has been generated, the endpoint 110 preferably encrypts the frame payload using the encryption key. The frame payload, along with a header that includes the nonce and endpoint 110 address (related to the endpoint MAC address), are sent over the air (OTA) to the bridge 120, where they are then encapsulated and forwarded to a router 130. At the router 130, the encryption key is generated using the same process; the router 130 requests the appropriate secret key from the key server 140 (linked to endpoint 110 MAC address), and uses the MAC address, secret key, and transmitted nonce to generate the encryption key. Finally, the router 130 decrypts the frame payload. Frames sent from the router 130 to the endpoint 110 preferably are encrypted using a process substantially similar to the reverse of the process described above (and as shown in FIG. 6).

The system 100 preferably uses an encryption process similar to the above process modified such that the endpoint 110 does not need to generate a new key for each frame (as key generation can be time consuming). The system 100 preferably uses a join key/session key approach based on the above encryption process, as described below.

Figure 7:
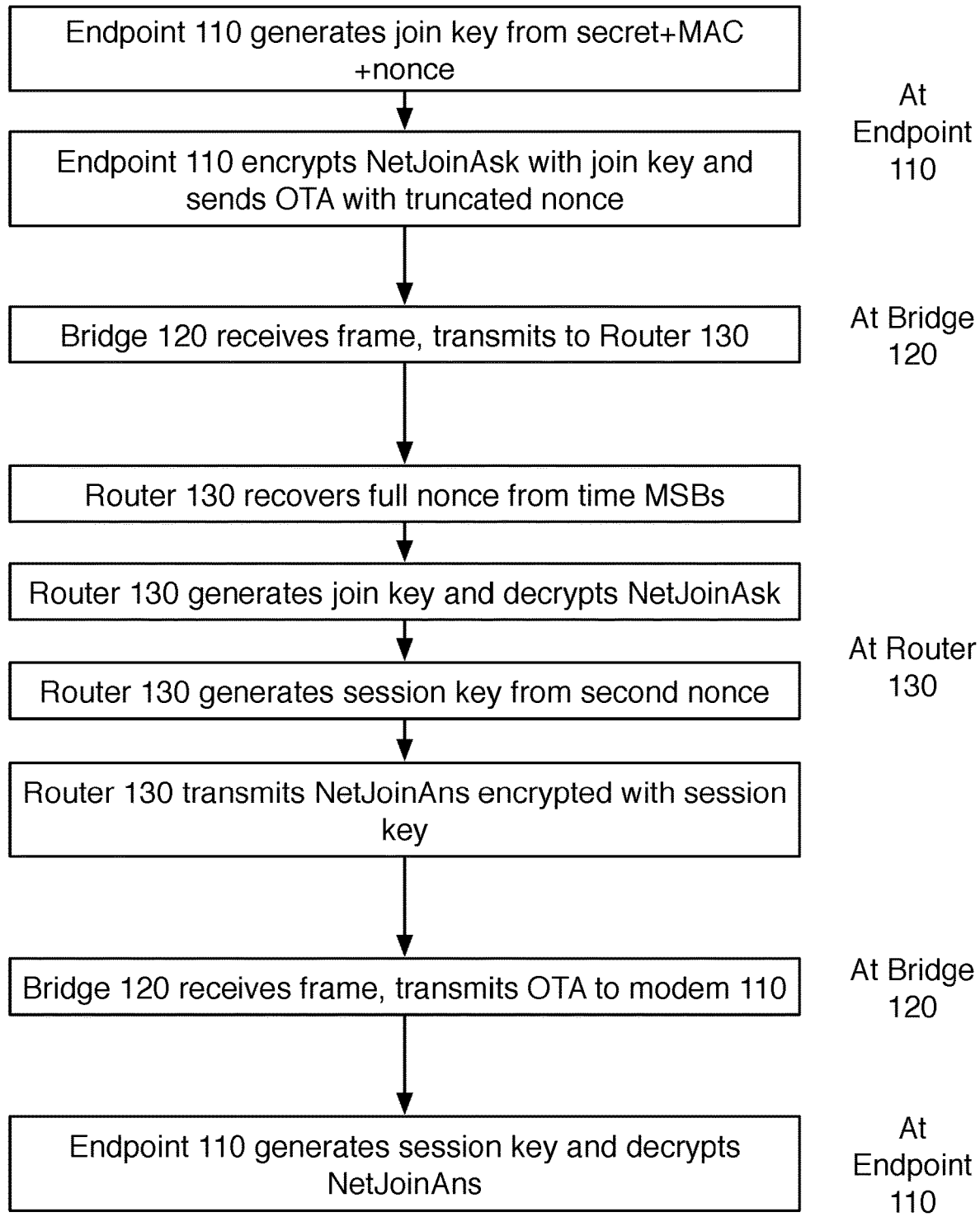
FIG. 7 is a flowchart representation of an encryption method of a system of a preferred embodiment.

As shown in FIG. 7, when an endpoint 110 joins a PAN of the system 100 for the first time (or for the first time after some time interval), the endpoint 110 preferably generates a join key (an encryption key specifically used for joining the PAN). As in the previously described method, the endpoint 110 first appends the endpoint 110's MAC addresses to a nonce. Here, the nonce is preferably a 64-bit value that contains 24 bits of random data, 32 bits of the current time, and an 8-bit rolling frame index. The nonce may additionally or alternatively be any suitable nonce, though the nonce preferably is different for each frame sent from an endpoint 110. The MAC+nonce value is then preferably transmitted to the HEM 114, which appends a secret key to the MAC+nonce value, and then uses the secret+MAC+nonce value to generate an encryption key (specifically, the join key). The algorithm used to generate the join key is preferably a SHA256 algorithm, but may additionally or alternatively be any suitable key-generating algorithm. Once the join key has been generated, the endpoint 110 preferably encrypts a NetJoinAsk frame with the join key, and transmits the encrypted frame, along with a precursor, over the air to a bridge 120. At the bridge 120, the encrypted frame and precursor are preferably then forwarded to a router 130 (after being encapsulated in a TCP/IP packet). The precursor preferably contains the nonce value, except that the 32-bit time is preferably truncated to its 8 lowest bits. Additionally or alternatively, the precursor may contain any amount of information suitable for recovering the nonce value.

At the router 130, the join key is preferably generated using the same process; the 64-bit nonce is generated by adding the 24 highest bits back to the 8 lowest (i.e., least significant) bits. This addition works as long as the join key is generated within 127 of seconds of the original generation (at the endpoint 110). Generating the nonce in this way preferably substantially limits the opportunity window for potential replay attacks, because any replay attacks must complete within 127 seconds.

The router 130 preferably then generates a second nonce and a second encryption key (referred to as a session key), encrypts a NetJoinAns frame and transmits it along with a precursor based on the second nonce, where it is then decrypted at the endpoint 110 after the endpoint 110 generates the session key.

At this point, the endpoint 110 and router 130 now both have the session key, which may be used to communicate for a set window of time (or even indefinitely). The session key preferably expires after a set time interval, but may additionally or alternatively expire after particular events (e.g., the connection of a certain additional number of devices to the PAN, a security event, or any other event occurring with or related to the system 100).

Note that while the encryption process for communications from the router 130 to the endpoint 110 is preferably substantially similar to the encryption process used for communications from the endpoint 110 to the router 130, there may alternatively be some variations; for example, communications from the router 130 may include the full 32-bit time in the precursor (as opposed to the eight least significant bits).

Using a separate join and session key has the advantage that the key for communication is generated fully within the key server 140 (or other part of the system 100 not local to the endpoint 110), which may further increase security over using a key generated at a potentially compromised endpoint 110.

The system 100 preferably never reuses the same key and nonce combination twice; this may create a serious security vulnerability. Each encrypted frame is preferably encrypted with a nonce that never repeats; non-repetition of the nonce is preferably enabled by using a nonce that includes both the current time and an incrementing index. As long as a nonce sends less than 255 frames per second (i.e., as long as the index does not repeat for a given time value), the nonce will not repeat.

The Router and each endpoint will track the frames received from the other side, and record the time/sequence values. This aspect of the nonce may additionally be used for extra security; the router 130 and/or endpoint 110 can check that the part of the nonce corresponding to time and index always increments (e.g., if the router 130 receives a frame associated with a time value and an index value, the next frame received should have either a higher time value or a higher index value). The router 130 or endpoint 110 may reject frames without incremented time+index values.

If an endpoint 110 has previously communicated with a router 130 using a session key, but disconnects from the PAN, the endpoint 110 may attempt to re-use the previously used session key. The endpoint 110 may accomplish this by sending an ftAssociateReq frame with the random bits of the nonce field set to zero; the router 130 preferably detects the zero value and attempts to decode the frame using a stored session key. Additionally or alternatively, the endpoint 110 may generate a join key for each reconnection.

Example formats for NetJoinAsk frames, NetJoinAns frames, and data frames are as shown in FIGS. 8, 9, and 10 respectively.

The above description describes random numbers used in nonce generation. The random numbers used to generate keys are preferably cryptographically secure. The router 130 preferably generates random numbers using the crypto/rand package standard library from the Go language, but may additionally or alternatively use any suitable random number generator. The endpoint 110 preferably uses a hardware random number generator, such as the one built into the AT86RF233 transceiver chip, which generates random numbers based on observed radio noise. To increase the security of random numbers generated, these random numbers may be used to seed a SHA2 stream of random numbers (as opposed to being used directly by the endpoint 110 or router 130. Each new batch of random numbers is preferably an SHA digest of the previous batch XOR-ed with 32 bytes of new unpredictable data (e.g., the output of the previously described random number generators).

Messages transmitted in the system 100 may additionally include data integrity checks. Without such checks, data transmitted in the system 100 may be vulnerable to transmission/reception errors as well as certain types of network attacks.

For example, a data frame that has a payload length of 100 bytes is encrypted with AES-256 such that each block has a length of 16 bytes. An attacker could intercept the frame before reception, and alter only the last 68 bytes, leaving the first 32 bytes (i.e., the header and the first encrypted block) unchanged. Then, the attacker could transmit the altered frame to the intended recipient, where the header would be validated and the first block decrypted successfully, but the rest of the received data would be corrupted.

The system 100 may address this issue by adding a checksum or hash to the end of the payload before encrypting; the payload could then be verified against the checksum or hash after decryption. If the checksum or hash did not properly check out, the frame may be discarded. In some implementations of the system 100, NetJoinAsk and NetJoinAns frames include a 4-byte CRC in the header (unencrypted), while data frames include a CRC appended to the payload before encryption.

The system 100 may additionally or alternatively employ any other suitable data security or data integrity mechanisms.

As a person skilled in the art will recognize from the previous detailed description and from the figures and claims, modifications and changes can be made to the preferred embodiments of the invention without departing from the scope of this invention defined in the following claims.

The invention claimed is:

1. An endpoint device for smart device networking comprising:
 a device interface that enables communication between the endpoint device and a connected device;
 a processor that is programmed to:
  (i) process data received from the connected device via the device interface to extract a property of the data, and generate a transmission instruction for transmitting at least a portion of the data to a remote server based on the property;
  (ii) detect a latency in receiving an instruction from the remote server, and in response to detecting the latency, generate a backup instruction to the connected device, and
 a wireless communication module configured to transmit the at least portion of the data to one or more bridges devices according to the transmission instruction, wherein the one or more bridge devices are in communication with the remote server over a WAN.

2. The endpoint device of claim 1, wherein the connected device has no WAN connectivity.

3. The endpoint device of claim 1, wherein the property of the data comprises a change in a value of the data.

4. The endpoint device of claim 3, wherein the property of the data is extracted by comparing the data to historical data received via the device interface.

5. The endpoint device of claim 4, wherein the transmission instruction in (i) is generated when the change exceeds a threshold.

6. The endpoint device of claim 1, wherein the backup instruction is generated based on (a) a correlation between a historical data pattern and historical instructions received from the remote server and (b) current data received via the device interface.

7. The endpoint device of claim 6, wherein the historical data pattern and a current data pattern are recognized using machine learning technique.

8. The endpoint device of claim 1, wherein the backup instruction comprises operational instructions to operate the connected device.

9. The endpoint device of claim 1, wherein the backup instruction is generated based on the latency and the data received via the device interface so as to modify the instruction received from the remote server.

10. The endpoint device of claim 1, wherein the processor is further programmed to manage one or more power parameters based on the data received via the device interface.

11. The endpoint device of claim 1, wherein the processor is further programmed to encrypt a data frame based on a cryptographic key and a MAC address of the endpoint device, and wherein the remote server comprises a key server operable to store the cryptographic key in association with the MAC address of the endpoint device and generate a session key based on the cryptographic key and the MAC address of the endpoint device.

12. The endpoint device of claim 11, wherein the processor is further programmed to combine the MAC address of the endpoint device and a nonce to create a value, and encrypt the data frame based on the cryptographic key and the value.

13. The endpoint device of claim 1, wherein the wireless communication module comprises a dual-band PAN radio or a multi-band radio.

14. The endpoint device of claim 1, wherein each of the one or more bridge devices comprises: (a) a dual-band PAN radio or a multi-band radio that communicates with the wireless communication module of the endpoint device, and (b) a WAN communications module that communicatively couples the bridge device to the WAN.

15. The endpoint device of claim 1, wherein each of the one or more bridge devices comprises a geolocation module operable to collect geolocation data associated with a location of the bridge device.

16. The endpoint device of claim 1, wherein the remote server is connected to the one or more bridge devices through the WAN.

17. The endpoint device of claim 1, wherein the WAN is the internet.

18. The endpoint device of claim 1, wherein the remote server hosts a router operable to route communication to and from the endpoint device.

19. The endpoint device of claim 1, wherein the processor is further programmed to encrypt a data frame based on a first cryptographic key and a nonce, and wherein the remote server is operable to receive the data frame through the WAN and decrypt the data frame based on a second cryptographic key and the nonce.

20. The endpoint device of claim 19, wherein the first cryptographic key is a non-secret key and the second cryptographic key is a secret key.

* * * * *